United States Patent
Boran et al.

(10) Patent No.: US 9,664,528 B2
(45) Date of Patent: May 30, 2017

(54) INERTIAL SENSOR ENHANCEMENT

(75) Inventors: Colm P. Boran, Novi, MI (US); Edward J. Bedner, Brighton, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 846 days.

(21) Appl. No.: 13/430,917

(22) Filed: Mar. 27, 2012

(65) Prior Publication Data
US 2013/0262020 A1  Oct. 3, 2013

(51) Int. Cl.
*G01C 25/00* (2006.01)
*G01P 21/00* (2006.01)

(52) U.S. Cl.
CPC ............ *G01C 25/005* (2013.01); *G01P 21/00* (2013.01)

(58) Field of Classification Search
CPC ........ G01C 25/005; G01C 21/26; G08G 1/16; B60K 31/0008; B60K 31/0083; B60T 2260/08; B60W 2550/143; B60W 2550/10; G01S 13/58; G01S 13/931; G01S 7/411
See application file for complete search history.

(56) References Cited

U.S. PATENT DOCUMENTS

| | | | |
|---|---|---|---|
| 6,401,036 B1 * | 6/2002 | Geier | G01S 19/49 180/167 |
| 2005/0225477 A1 * | 10/2005 | Cong et al. | 342/70 |
| 2007/0282529 A1 | 12/2007 | Thompson et al. | |
| 2008/0061625 A1 | 3/2008 | Schmitt et al. | |
| 2008/0077284 A1 | 3/2008 | Swope | |
| 2009/0045672 A1 * | 2/2009 | Nishino | B60T 7/042 303/113.3 |
| 2009/0089002 A1 * | 4/2009 | Walter | B60T 8/172 702/96 |
| 2009/0265054 A1 * | 10/2009 | Basnayake | B60W 40/11 701/31.4 |
| 2010/0088027 A1 | 4/2010 | Bye | |
| 2011/0015817 A1 | 1/2011 | Reeve | |
| 2011/0295549 A1 * | 12/2011 | Takabayashi et al. | 702/142 |
| 2013/0231825 A1 * | 9/2013 | Chundrlik, Jr. | B60W 50/0098 701/29.1 |

OTHER PUBLICATIONS

International Search Report for PCT/US2013/033259, Dated Jun. 13, 2013.

* cited by examiner

*Primary Examiner* — Gregory J Toatley
*Assistant Examiner* — Kyle R Quigley
(74) *Attorney, Agent, or Firm* — Brinks Gilson & Lione

(57) ABSTRACT

A system is provided for enhancing inertial sensing within a vehicle. The system determines measured rotational rates and translational accelerations of the vehicle using an inertial measurement unit. In addition, the system also determines estimated rotational rates and translational accelerations of the vehicle based on a remote sensing system. The system generates compensated rotational rates and translational accelerations to reduce gain errors or offset errors of the inertial measurement unit based on the estimated rotational rates and translational accelerations.

22 Claims, 4 Drawing Sheets

INERTIAL SENSOR ENHANCEMENT

BACKGROUND

The present invention relates generally to an enhanced inertial sensor system.

Occupant restraint systems and vehicle dynamics control systems (like Electronic Stability Control) typically use inertial sensors such as accelerometers and gyroscopes to detect events that warrant operation of the various restraining/stabilizing actuators. Occupant restraint systems typically need to sense relatively large, abrupt changes in acceleration and/or rotational rate over a short time period. Vehicle dynamics control systems typically need to sense comparatively smaller, subtler changes in acceleration and rotational rate over a longer time period. Selecting a single accelerometer and/or single rotational rate sensor that can measure the larger signals required by a restraint system, and is also capable of accurately measuring the smaller signals required by the vehicle dynamics control system, is typically difficult because the gain and offset errors of the large signal sensors are often greater than the requirements for stability control systems. Minimizing the gain and offset errors in the accelerometers and gyroscopes through sensor improvements alone, or individual calibration, often becomes cost prohibitive.

BRIEF SUMMARY

In satisfying the above need, as well as overcoming the enumerated drawbacks and other limitations of the related art, the present application provides system for enhancing the use of an inertial sensor.

The system determines measured rotational rates and translational accelerations of the vehicle using an inertial measurement unit including, for example linear accelerometers and/or a rotational rate sensor such as a gyroscope. In addition, the system also separately determines estimated rotational rates and translational accelerations of the vehicle based on another sensing system, for example a remote sensing system. The remote sensing system estimates rotational rates and translational accelerations based on interaction with elements external to the vehicle, for example the road, a tree, or a satellite. Examples of the remote sensing system may include a vision system, a range sensor, or a global positioning system (GPS). The system generates compensated rotational rates and translational accelerations to reduce gain errors or offset errors of the rotational rates and translational accelerations from the inertial measurement unit based on the estimated rotational rates and translational accelerations. As such, the compensated rotational rates and translational accelerations allow the wide dynamic range inertial sensors that are used for sensing crash events, to also be used for vehicle stability applications.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

In the accompanying drawings the components are not necessarily to scale, emphasis instead being placed upon illustrating the principles of the invention. Moreover, like reference numerals designate corresponding parts throughout the views.

DETAILED DESCRIPTION OF THE INVENTION

Figure 1:
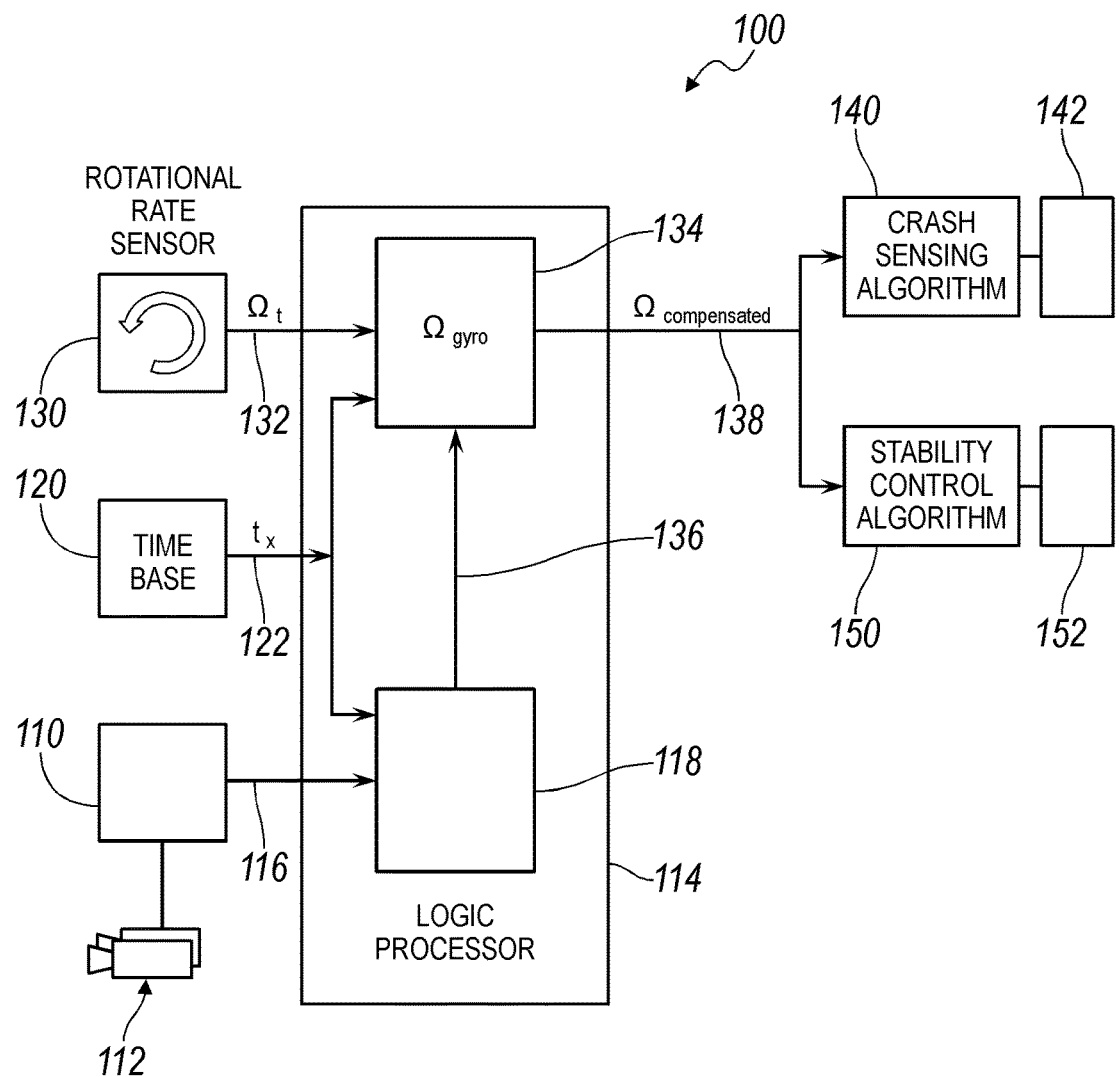
FIG. 1 is a schematic illustration of a system for processing vision system data and inertial sensor data.

Referring now to FIG. 1, a system embodying the principles of this application is illustrated therein and designated at 100. The system 100 may include a remote sensing system located on board a vehicle to determine estimated rotational rates and translational accelerations based on observing fixed objects in the environment around the vehicle as it is moving. The estimated rotational rates and translational accelerations from the remote sensing system may be used by signal processing logic to reduce the gain and offset errors of the measured rotational rates and translational accelerations from the inertial measurement unit. The compensated rotational rates and translational accelerations allow the wide dynamic range inertial sensors used for sensing crash events, to also be used for vehicle stability applications.

The system 100 may also include a remote sensing system 110, a time device 120, an inertial measurement unit 130, and a logic processor 114. Examples of the remote sensing system may include, for example, a vision system, a range sensor system, or a global positioning system (GPS), or any combination thereof. The remote sensing system 110 may include a vision processor and may be connected to one or more cameras 112 for receiving an image. The cameras 112 may include a CCD, CMOS, or similar photo-sensitive array of elements. The cameras 112 may also include optics for focusing or conditioning the light that is received onto the photo-sensitive array. The photo-sensitive array may then digitize the image information and provide it to the vision processor within the remote sensing system 110. Various feature information may be extracted from the image data to determine the position or orientation of objects in the field of view of the cameras 112. Rotational rates and translational accelerations of the vehicle may be calculated by the remote sensing system 110 independent of the inertial measurement unit 130.

Figure 2:
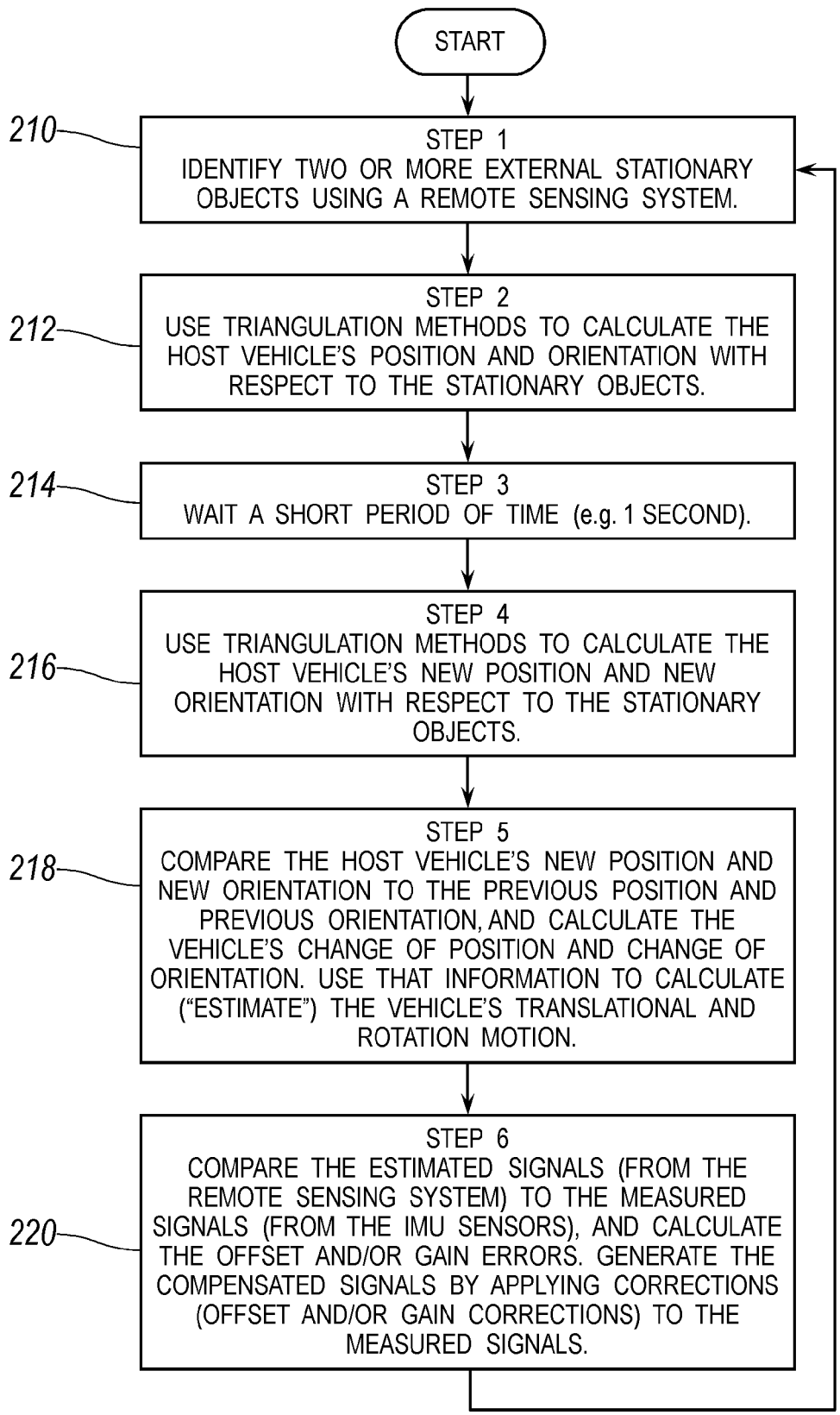
FIG. 2 is flowchart illustrating a method of using a remote sensing system to enhance the signals of an inertial measurement unit.

Now referring to FIG. 2, a method for compensating inertial measurements is provided. The method may be implemented in software which is executed repeatedly in real-time on a microcontroller. In Step 1 (210), a remote sensing system is used to identify stationary objects that are external to the host vehicle. The remote sensing device may include one or more of radar systems, vision systems, and GPS systems, or any combination of the above. In Step 2 (212), "triangulation" methods are used to calculate the host vehicle's position and orientation with respect to the stationary objects. The triangulation method may determine the present position and orientation of the host vehicle by measuring the distances and angles from the host vehicle to two or more remote objects, although it is understood that stereo sensing could be utilized with a single stationary object. Radar systems and vision systems also generally utilize at least two stationary remote objects for triangulation. However, GPS systems generally utilize at least three satellites as the remote objects for triangulation. Typical triangulation method details are described in a later section.

In Step 3 (214), a short period of time is allowed to pass (e.g. 1 second) as the host vehicle moves to a new position. In Step 4 (216), triangulation methods may be used again to calculate the host vehicle's new position and new orientation with respect to the same stationary objects from Step 1 (210). In Step 5 (218), the host vehicle's new position and new orientation are compared to the previous position and previous orientation. Calculations are made to determine the change of position and the change of orientation. The change of position and the change of orientation are then used to calculate ("estimate") the vehicle's translational and rotational motion. In Step 6 (220), the estimated signals (i.e. the host vehicle's estimated translational and rotational motion from the remote sensing system) are compared to the measured signals from the IMU sensors, to then calculate the offset and/or gain errors. Finally the process generates the compensated translational and rotational motion signals by applying corrections (offset and/or gain corrections) to the measured signals, using various techniques for signal processing. The process returns to Step 1 (210) and continuously repeats. By following the method described above, the compensated rotational rates and translational accelerations have improved accuracy compared to the IMU measurement signals, and they may meet the requirements for both the restraint control system and the stability control system.

Figure 3A:
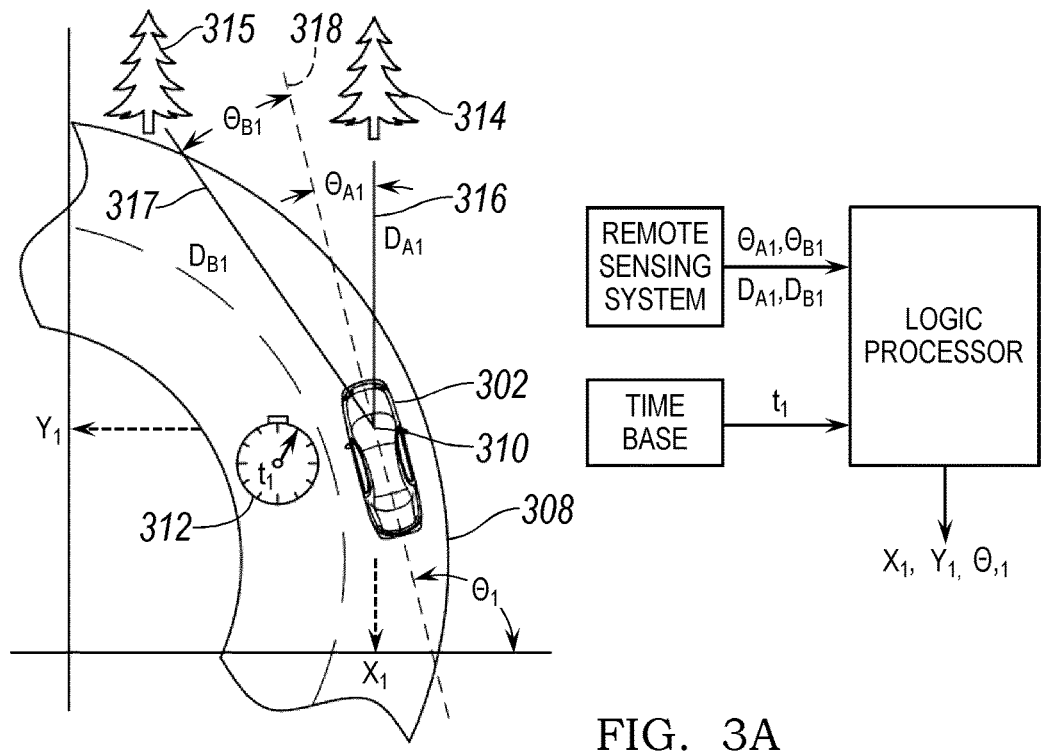
FIGS. 3a and 3b are graphical illustrations of a system using a remote sensing system to enhance the signals of an inertial measurement unit.

One example of the system implementation is described below with respect to FIG. 3a. The system 100 may be integrated into a vehicle 302. The vehicle 302 may be driving along a road 308. At a first point in time as denoted by reference numeral 312, the vehicle 302 may be located at a first position 310. At the first position 310, the principle axis of the vehicle is shown as line 318. The system 100 may identify a plurality of objects in the field of view of the camera, for example object 314 and object 315. The location of object 314 within the field of view is denoted by line 316. As such, an angle $\theta_{A1}$ may be identified between the central axis 318 of the vehicle 302 and the line 316 indicating the location of the object 314 within the field of view. In addition, a distance $D_{A1}$ from the vehicle 302 to the object 314 may also be calculated. Similarly, an angle $\theta_{B1}$ may be identified between the central axis 318 of the vehicle 302 and the line 317 indicating the location of the object 315 within the field of view and a distance $D_{B1}$ may be calculated from the vehicle 302 to the object 315.

Figure 3B:
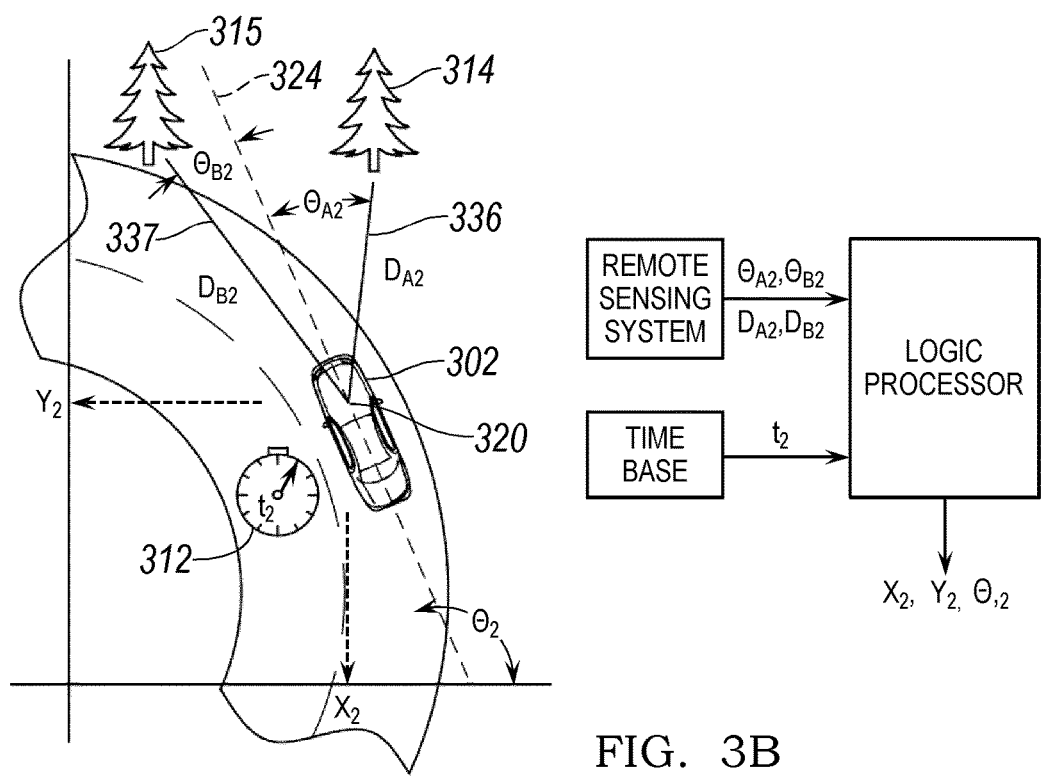

At a second time depicted in FIG. 3B and denoted by reference numeral 322, the vehicle 302 will have moved to a second position 320. At the second position 320, the central axis of the vehicle may have changed as denoted by line 324. Again, the cameras 112 of system 100 may identify the object or group of objects denoted by reference numeral 314 within the field of view. The angle $\theta_{A2}$ between the central axis 324 of the vehicle 302 and the location of the object 314 in the field of view as denoted by line 336 is then calculated. In addition, a distance $D_{A2}$ from the vehicle 302 to the object 314 may also be calculated. Similarly, an angle $\theta_{B2}$ may be identified between the central axis 318 of the vehicle 302 and the line 337 indicating the location of the object 315 within the field of view and a distance $D_{B2}$ may be calculated from the vehicle 302 to the object 315.

Various signals including, for example, $\theta_{A1}$, $\theta_{B1}$, $\theta_{A2}$, $\theta_{B2}$, $D_{A1}$, $D_{B1}$, $D_{A2}$, and $D_{B2}$, as well as the corresponding time of each parameter may be provided to the logic processor by the time device 120 as denoted by line 116 and line 122, as shown in FIG. 1. From this information the logic processor may determine a position (X,Y) and orientation ($\theta$) of the host vehicle at each moment in time as denoted by block 118. At each moment in time, the change of the host vehicle's position and the change of orientation are then used to calculate ("estimate") the vehicle's translational and rotational motion.

The measured rotational rates and translational accelerations are provided to block 134, as denoted by line 132. The time device 120 provides a time signal 122 that is used by block 134 to identify the measured rotational rates and translational accelerations with respect to time. Block 134 may receive the estimated rotational rates and translational accelerations determined by the remote sensing system 110 from block 118. Accordingly, the measured rotational rates and translational accelerations from the inertial measurement unit 130 may be compensated based on the estimated rotational rates and translational accelerations from the remote sensing system 110.

The measured rotational rates and translational accelerations determined by the inertial measurement unit 130 may be calculated separately from the remote sensing system 110 by the logic processor 114. The logic processor 114 uses the remote sensing system 110 estimates to compensate the gain and offset errors from measured rotational rates and translational accelerations from the inertial measurement unit 130 or individually for each inertial sensor in the inertial measurement unit 130. The compensated rotational rates and translational accelerations ($\Omega_{compensated}$, $a_{compensated}$) may be used in both the crash sensing and stability control algorithms.

In some implementations the offset and/or gain of the measured rotational rates and translational accelerations from the inertial measurement unit 130 may be adjusted according to a linear relationship based on the estimated rotational rates and translational accelerations from the remote sensing system 110. For example, the gain and offset of the rotational rate measurements may be calculated based on the relationship:

$$\Omega_{remote}=(\Omega_{imu}*\text{gain})+\text{offset}$$

where $\Omega_{remote}$ is the estimated rotational rate from the remote sensing system and $\Omega_{imu}$ is the measured rotational rate from the inertial sensor. Likewise the gain and offset of the translational acceleration measurements may be calculated based on the relationship:

$$a_{remote}=(a_{imu}*\text{gain})+\text{offset}$$

where $a_{remote}$ is the estimated translational acceleration from the remote sensing system and $a_{imu}$ is the measured translational acceleration from the inertial sensor.

In one example, if the remote sensing system senses the vehicle is in a turn, the gain of an accelerometer may be calculated according to the amount of acceleration sensed by the vision system. In the case of a gyroscope, the gain of the rotational rate of change may be calculated according to the rotational rate of change sensed by the remote sensing system. In another example, the offset of an accelerometer or rotational rate of change may be calculated based on the vision system when the vehicle is presented with a long straight stretch of road, for example a ¼ mile stretch. In yet another example, the offset of the accelerometer or rotational rate of change may be calculated or zeroed when the vehicle is stationary. In yet other examples, both the gain and offset may be solved for simultaneously. The above strategy may be used in combination with any of the remote sensing systems mentioned herein.

The compensated values for the offset and gain of the rotational rates and translational accelerations from the inertial measurement unit may be automatically recalculated based on various criteria. The criteria may include a measured deviation between the remote sensing system and the inertial measurement unit, a change in ambient temperature, a change in vehicle temperature, a sensed road condition (e.g. a consistent curve within a predetermined radius range or a straight away of a predetermined length), a predefined time period, or any combination of the above criteria.

The compensated rotational rates and translational accelerations from block 134 may be provided to external systems as denoted by line 138. For example, the compensated rotational rates and translational accelerations 138 may be provided to a crash sensing system 140 to determine if a crash is occurring and control safety systems such as seatbelt tensioners or airbag controllers as denoted by block 142. In addition, the compensated rotational rates and translational accelerations 138 may be provided to a stability control system as denoted by block 150. The stability control system 150 may control brake fluid pressure in a braking system, as well as, strut pressure in an active suspension system, or steering angle in an active steering system, as denoted by block 152, based on the compensated rotational rates and translational accelerations 138.

Providing the system in one of the configurations described above allows wide dynamic range sensors to be used for both large and small signal applications without elaborate sensor calibration techniques. In addition, these configurations provide an independent plausibility check to detect sensor failures.

The results provided by any of the above described systems may also be enhanced by known techniques used in conjunction with adjusting the gain and offset of the sensor. In one example, the sensor signals may also be over sampled or filtered to extract smaller/subtler signals. In another example, the sensor and ECU assemblies may be individually temperature compensated to help eliminate offset and gain errors for each sensor.

In other implementations, two or more of the vision system, range sensor, or positioning system may be used together to estimate the rotational rates and translational accelerations of the vehicle. In one example, the estimated rotational rates and translational accelerations of the vision system, range sensor, and/or the positioning system may be combined, for example by a weighted averaging, to provide an enhanced estimate. When used in combination the rotational rates and translational accelerations may be calculated separately according the vision system, range sensor, and/or the positioning system as described with respect to the above implementation and then combined.

Figure 4:
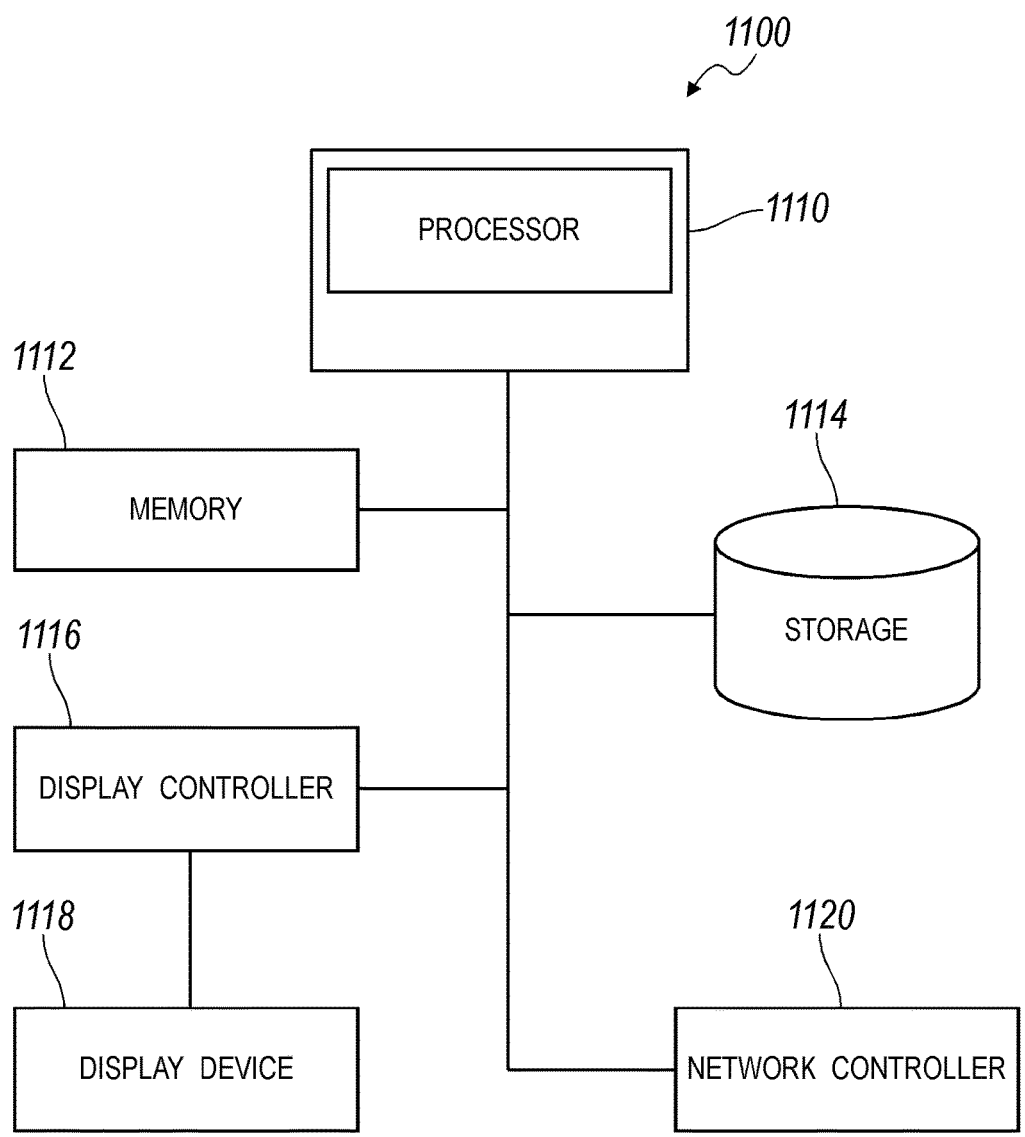
FIG. 4 is schematic view of a computer system for implementing the methods described herein.

Any of the modules, servers, routers, storage units, controllers, or engines described may be implemented with one or more computer systems. If implemented in multiple computer systems the code may be distributed and interface via application programming interfaces. Further, each method may be implemented on one or more computers. One exemplary computer system is provided in FIG. 4. The computer system 1100 includes a processor 1110 for executing instructions such as those described in the methods discussed above. The instructions may be stored in a computer readable medium such as memory 1112 or a storage device 1114, for example a disk drive, CD, or DVD. The computer may include a display controller 1116 responsive to instructions to generate a textual or graphical display on a display device 1118, for example a computer monitor. In addition, the processor 1110 may communicate with a network controller 1120 to communicate data or instructions to other systems, for example other general computer systems.

The network controller 1120 may communicate over Ethernet or other known protocols to distribute processing or provide remote access to information over a variety of network topologies, including local area networks, wide area networks, the internet, or other commonly used network topologies.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this application. This description is not intended to limit the scope or application of the claim in that the invention is susceptible to modification, variation and change, without departing from spirit of this application, as defined in the following claims.

What is claimed is:

1. A system for enhancing inertial sensing within a vehicle, the inertial sensing being communicated to a crash detection unit and a stability control unit, the system comprising:
   a processor unit;
   an inertial measurement unit comprising at least one accelerometer or gyroscope in communication with the processor unit to generate measured rotational rate and translational acceleration of the vehicle;
   a remote sensing system in communication with the processor unit to generate an estimated rotational rate and translational acceleration of the vehicle; and
   wherein the processor unit generates a compensated rotational rate and translational acceleration based on the estimated rotational rate and translational acceleration, the processor recalculating a gain and offset of the inertial measurement unit by comparing the measured rotational rate and translational acceleration to the estimated rotational rate and translation acceleration in response to the processor determining, based on the remote sensing system, that the vehicle is traveling along a straight away, the processor communicating the compensated rotational rate and translational acceleration to both the crash detection unit and the stability control unit.

2. The system according to claim 1, wherein the remote sensing system determines the estimated rotational rate and translational acceleration based on at least one object external to the vehicle.

3. The system according to claim 1, wherein the remote sensing system determines a first angle between a central axis of the vehicle and a first object at a first vehicle position, and the remote sensing system determines a second angle between the central axis of the vehicle and a second object at the first vehicle position.

4. The system according to claim 3, wherein the remote sensing system determines a third angle between a central axis of the vehicle and the first object at a second vehicle position, and the remote sensing system determines a fourth angle between the central axis of the vehicle and the second object at the second vehicle position.

5. The system according to claim 4, wherein the remote sensing system determines the estimated rotational rate and translational acceleration of the vehicle based on the first angle, the second angle, and an amount of time elapsed between the first position and the second position.

6. The system according to claim 4, wherein the remote sensing system determines a first distance between the vehicle and a first object at the first vehicle position, and the remote sensing system determines a second distance between the vehicle and the second object at the first vehicle position.

7. The system according to claim 6, wherein the remote sensing system determines a third distance between the vehicle and the first object at the second vehicle position, and the remote sensing system determines a fourth distance between the vehicle and the second object at the second vehicle position.

8. The system according to claim 7, wherein the remote sensing system determines the estimated rotational rate and translational acceleration of the vehicle based on the first angle, the second angle, the third angle, the fourth angle, the first distance, the second distance, the third distance, the fourth distance, and an amount of time elapsed between the first vehicle position and the second vehicle position.

9. The system according to claim 1, wherein the remote sensing system is a vision system located within the vehicle.

10. The system according to claim 1, wherein the remote sensing system is a radar system located within the vehicle.

11. The system according to claim 1, wherein the remote sensing system is a global positioning system located within the vehicle.

12. The system according to claim 1, wherein the processing unit is in communication with the crash detection unit and the stability control unit, and wherein both the occupant safety control system and the stability control unit utilize the compensated rotational rate.

13. The system according to claim 1, wherein the electronic stability control system controls brake fluid pressure based on the compensated rotational rate and translational acceleration.

14. A method for enhancing inertial sensing within a vehicle, the inertial sensing being communicated to a stability control unit, the method comprising:

determining measured rotational rates and translational accelerations of the vehicle using an inertial measurement unit comprising at least one accelerometer or gyroscope;

determining estimated rotational rates and translational accelerations of the vehicle based on a remote sensing system; generating compensated rotational rates and translational accelerations to reduce gain errors of the inertial measurement unit based on the estimated rotational rates and translational accelerations;

recalculating a gain or offset of the inertial measurement unit by comparing the measured rotational rates and translational accelerations to the estimated rotational rates and translation accelerations in response to the processor determining that the vehicle has encountered a particular road condition, wherein the particular road condition is a straight away or a consistent horizontal curve within a predetermined radius range;

communicating the compensated rotational rate and translational acceleration to the stability control unit.

15. The method according to claim 14, wherein the remote sensing system determines a first angle between a central axis of the vehicle and a first object at a first vehicle position, and the remote sensing system determines a second angle between the central axis of the vehicle and a second object at the first vehicle position.

16. The method according to claim 15, wherein the remote sensing system determines a third angle between a central axis of the vehicle and the first object at a second vehicle position, and the remote sensing system determines a fourth angle between the central axis of the vehicle and the second object at the second vehicle position.

17. The method according to claim 16, wherein the remote sensing system determines the estimated rotational rate and translational acceleration of the vehicle based on the first angle, the second angle, and an amount of time elapsed between the first position and the second position.

18. The method according to claim 16, wherein the remote sensing system determines a first distance between the vehicle and a first object at the first vehicle position, and the remote sensing system determines a second distance between the vehicle and the second object at the first vehicle position.

19. The method according to claim 18, wherein the remote sensing system determines a third distance between the vehicle and the first object at the second vehicle position, and the remote sensing system determines a fourth distance between the vehicle and the second object at the second vehicle position.

20. The method according to claim 19, wherein the remote sensing system determines the estimated rotational rate and translational acceleration of the vehicle based on the first angle, the second angle, the third angle, the fourth angle, the first distance, the second distance, the third distance, the fourth distance, and an amount of time elapsed between the first vehicle position and the second vehicle position.

21. The method according to claim 14, wherein the processing unit is in communication with the stability control unit, and wherein the stability control unit utilizes the compensated rotational rate.

22. The method according to claim 14, wherein the particular road condition is a consistent horizontal curve within a predetermined radius range.

* * * * *